March 10, 1942.  F. A. ANETSBERGER ET AL  2,275,714
DOUGH SHEETER
Filed Sept. 25, 1941  3 Sheets-Sheet 1
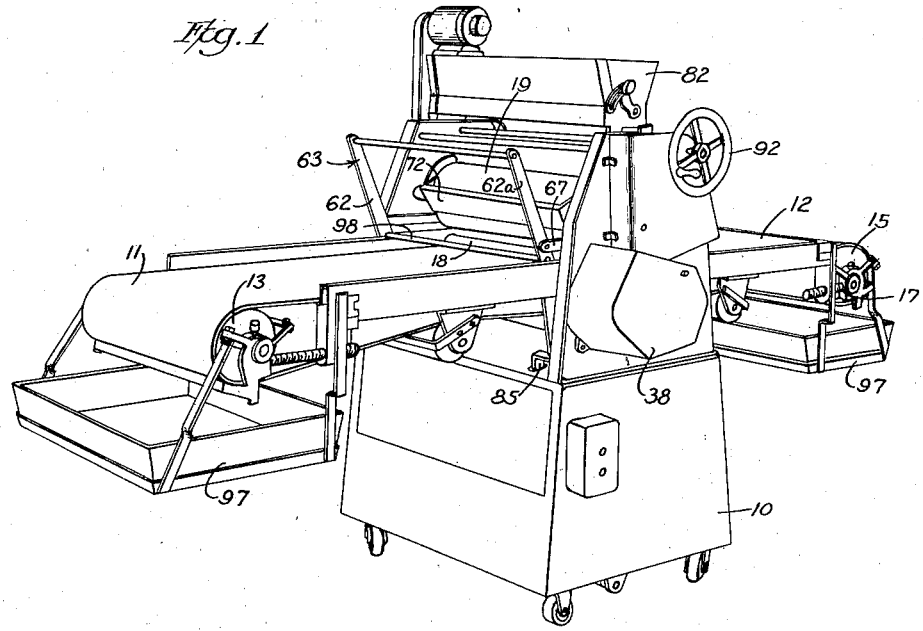
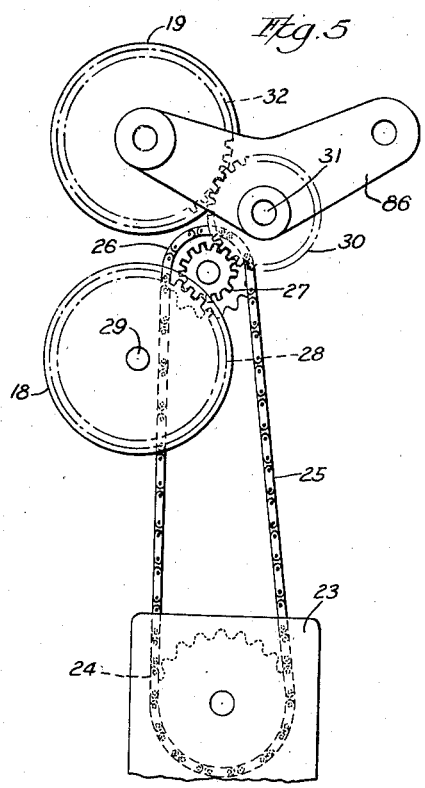
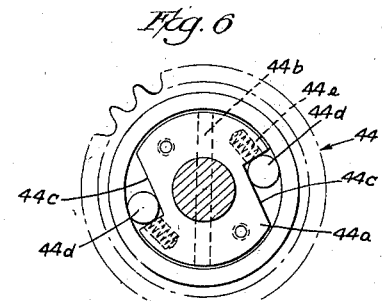
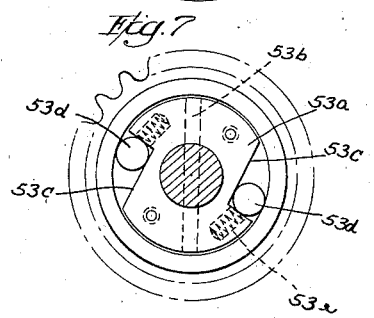
Inventors.
Frank A. Anetsberger
Dean H. Whitehead

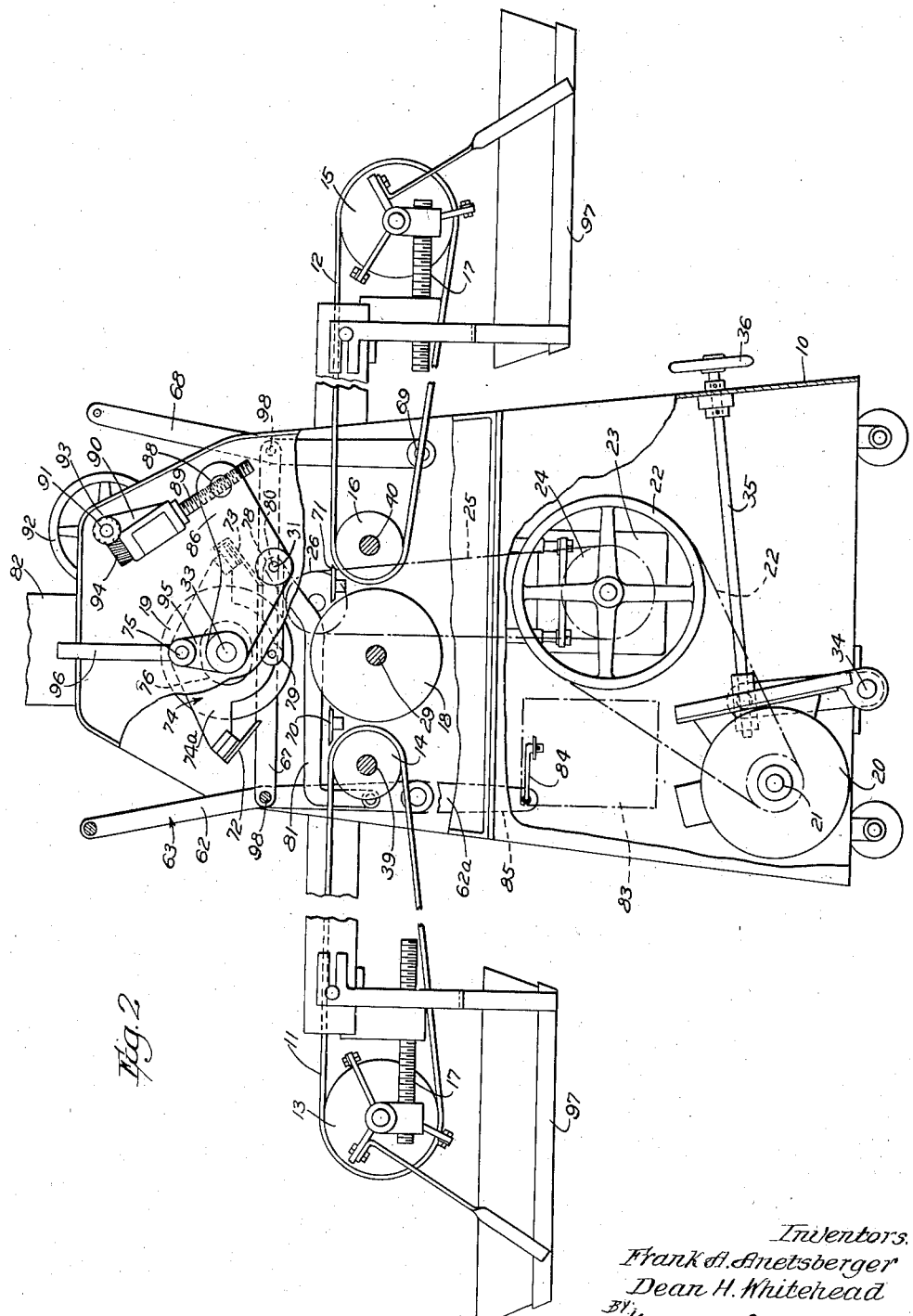

March 10, 1942.  F. A. ANETSBERGER ET AL  2,275,714
DOUGH SHEETER
Filed Sept. 25, 1941  3 Sheets-Sheet 3

Inventors.
Frank A. Anetsberger
Dean H. Whitehead
By
Sheridan, Ross & Cargill
Attys.

Patented Mar. 10, 1942

2,275,714

UNITED STATES PATENT OFFICE 2,275,714

DOUGH SHEETER

Frank A. Anetsberger, Chicago, and Dean H. Whitehead, Oak Park, Ill., assignors to Frank A. Anetsberger and William A. Anetsberger, a co-partnership doing business as Anetsberger Brothers, Chicago, Ill.

Application September 25, 1941, Serial No. 412,276

8 Claims. (Cl. 107—12)

This invention relates to improvements in dough sheeters.

In various bakeries dough is prepared frequently in relatively large quantities and must be rolled out in sheets preparatory to making certain bakery products. The present improvements relate to mechanism for performing such operation.

One object of the invention is to provide a machine for sheeting dough or other sheetable material which may be operated for progressively reducing the sheet to the thinness required by passing the sheet back and forth between a pair of cooperating sheeting members.

Another object of the invention is to provide a dough sheeting machine having a pair of conveyors for moving the dough to and from the sheeting rolls and means for driving the conveyors at different relative linear velocities for preventing the formation of wrinkles or other irregularities in that portion of the dough sheet that has passed through the rolls and onto the conveyor which receives the sheet.

Another object of the invention is to provide a dough sheeter provided with a pair of dough conveyors and intermediate sheeting rolls and means for simultaneously reversing the direction of rotation of the sheeting rolls and the direction of travel of the conveyors whereby a sheet of dough can be passed back and forth between the rolls to reduce it to a desired thickness.

A further object of the invention is to provide a pair of scrapers or doctors for one of the sheeting rolls, which scrapers operate alternately in accordance with the reversal of direction of rotation of the rolls.

An additional object of the invention is to provide a gauge for indicating the vertical spacing between the sheeting rolls and thereby indicate the thickness of the sheet of dough or a portion thereof that has passed between said rolls.

A further object of the invention is to provide manually operable means for controlling the mechanism that reverses the direction of operation of the rolls and conveyors and which means constitutes safety means which preclude the inadvertent or accidental engagement of the operator's hand by the rolls.

Other objects of the invention relate to various features of construction and arrangement of parts which will be apparent from a consideration of the following specification and accompanying drawings wherein:

Figure 1 is a perspective view of a dough sheeting machine embodying the present improvements;

Fig. 2 is a broken side elevation of the machine, certain parts being omitted for the purpose of clarity of illustration;

Fig. 3 is a broken top plan view of a clutch controlled mechanism for operating the conveyors at different linear velocities;

Fig. 4 is an elevation of the mechanism shown in Fig. 3;

Fig. 5 is a view illustrating a portion of the roll driving mechanism;

Fig. 6 is a section taken on line 6—6 of Fig. 3.

Fig. 7 is a section taken on line 7—7 of Fig. 3.

Fig. 8 is a section taken on line 8—8 of Fig. 3.

In the drawings, 10 is a casing which encloses the operating means for the rolls and conveyors and certain other parts and is provided with a suitable supporting frame not shown in detail. Two endless conveyors 11 and 12, are provided which are operably mounted on a pair of rollers. Conveyor 11, as shown in Fig. 2, passes around the supporting rollers 13 and 14 while conveyor 12 passes around the rollers 15 and 16. The rollers 14 to 16 inclusive are journaled in portions of the frame of the machine, the rollers 13 and 15 preferably being arranged for adjustment in directions for tightening the respective conveyors or belts 11 and 12 as by means of the tightening members 17. The rollers 14 and 16 are driven, by means hereafter described, in common directions, that is, when the machine is in operation both are operated either clockwise or counter-clockwise. The intermediate rollers 14 and 15 are spaced apart as illustrated in Fig. 2 and between said rollers is disposed a dough sheeting roll 18 while above the latter is a cooperating sheeting roll 19.

In the use of the machine in sheeting dough the latter is placed on one of the conveyors, as conveyor 11 and is initially stretched or flattened out somewhat by hand. The machine is then placed in operation whereby the conveyors and lower roll 18 are operated in a clockwise direction, as viewed in Fig. 2, whereby the dough is delivered by the conveyor 11 to the rolls. Since the rolls reduce the dough to sheet form the upper roll will be driven in a counter-clockwise direction for cooperation with the lower roll in producing the result stated. The resulting thickness of the sheet will depend on the vertical spacing of the sheeting rolls, which may be varied, as will be explained hereinafter. The dough sheet, issuing from between the rolls 18 and 19 is carried by the conveyor 12 in a direction away from the rolls, that is, toward the right as viewed in Fig. 2.

When the dough has passed between the rolls 18 and 19 onto the conveyor 12, (the conveyors being of any required length) the direction of operation of the conveyors and of the rolls may be reversed and the sheet repassed between the rolls, which may or may not, depending on the desired character of the sheet, be spaced more closely together for the purpose of further reducing the thickness of the sheet.

In some instances the dough sheet is treated with butter or other substances as it issues from the rolls, is folded lengthwise progressively as it moves away from the rolls and is then repassed through the rolls as above described, while in other instances it may be passed but once through the rolls for reducing it to a sheet of the required thickness.

In dough sheeters of the character employing a pair of sheeting rolls, the dough issues or is expressed from the rolls at a linear velocity greater than the entering velocity of the thicker mass of dough on the feeding or intake side of the rolls. The increase in velocity of the outcoming dough sheet will cause the latter to lie on the receiving conveyor in the form of wrinkles or other irregularities where the velocities of the conveyors are equal. In the present machine therefore, the receiving conveyor, (which is conveyor 12 when the dough is moving from left to right in Fig. 2), is caused to move at a greater linear velocity than the other or feeding conveyor. The preferred velocity ratio of the feeding conveyor to the velocity of the receiving conveyor is about 1 to 2, that is, the receiving conveyor preferably moves at about twice the linear velocity of the feeding conveyor. Inasmuch as the character of each conveyor changes, that is, from feeding to receiving or vice versa, as the direction of movement of the dough is altered, mechanism is provided for effecting automatically the reversal of the speed ratios of the conveyors with each reversal of the direction of movement thereof as will be described later.

Mechanism for driving the conveyors 11 and 12 and the rolls 18 and 19 comprises a motor 20 which is mounted in the casing 10 and preferably is provided with a variable speed drive pulley 21 of the Reeves type. A belt 22 from the pulley 21 drives a pulley 22 of a conventional speed reducing mechanism, illustrated generally by the numeral 23, and having a drive sprocket 24 which, by means of a chain 25, drives a sprocket 26 as shown in Figs. 2 and 5. For the purpose of avoiding confusion in Fig. 2, the remaining portions of the driving means is not shown in said figure but is illustrated in Fig. 5. Operatively attached to the sprocket 26 is a gear 27 which meshes with a gear 28 which is mounted on the shaft 29 on which the lower roll 18 is also mounted. Gear 27 likewise meshes with an idler gear 30 which is mounted on a shaft 31. Gear 31 meshes with a gear 32 mounted on the shaft 33 which carries the upper roll 19.

The above described driving mechanism operates the rolls 18 and 19 at equal peripheral velocities which may be altered by shifting the motor 20 about a pivotal axis 34 by means of a threaded rotatable shaft 35 having a hand wheel 36 located at one side of the casing 10 as illustrated in Fig. 2. Thus turning the hand wheel 36 in a direction causing the motor to swing counter-clockwise about the axis 34 will, by reason of the well known action of the pulley 21, reduce the velocity of the driving chain and hence also the rate of rotation of the rolls 18 and 19, while movement of the hand wheel in the opposite direction will increase the rotating speed of the rolls. Hence with light or less dense doughs the sheeting operations can be accelerated if desired.

Mechanism for operating the conveyors is illustrated in Figs. 3 and 4. In Fig. 3, it will be seen that the shaft 29 of the lower sheeting roll 18 extends through and is journaled in a portion 37 of the machine frame and projects into a housing 38 on the side of the casing 10. Shafts 39 and 40 of the rollers 14 and 16 respectively likewise extend through the frame section 37 and into the housing 38. Rotatably mounted on the shaft 29 is a double sprocket 41 having two sprocket wheels 42 and 43, the former of greater diameter than the latter. On shaft 40 is mounted a free-wheeling sprocket 44 around which and the sprocket 42 is a drive chain 45. On shaft 39 is secured a sprocket 46 over which and the sprocket 43 is a drive chain 47. The driving ratios of the chains 45 and 47, determined by the relative diameters of their respective sprockets is preferably 2 to 1, that is, when the double sprocket 41 is driven by being clutched to the shaft 29, as later described, the shaft 40 will be driven at twice the peripheral velocity as the shaft 39, and hence the conveyor 12 will be driven at twice the linear velocity of the conveyor 11.

A second double sprocket, indicated generally by the numeral 48 is also loosely or rotatably mounted on the shaft 29 in a position suitably spaced from the sprocket 41. Double sprocket 48 has two sprocket wheels 49 and 50, the latter of greater diameter. Mounted on shaft 40 is a sprocket 51 of the same diameter as sprocket 46 and over sprocket 51 and sprocket 49 is trained a drive chain 52. Opposite sprocket 50, a sprocket 53 is secured to shaft 39 and over sprockets 39 and 53 is trained a drive chain 54. Sprocket 53 is shown as being of the same diameters as sprocket wheels 50 and 49 respectively.

When the double sprocket 48 is driven by the shaft 29, the shaft 39 will, by reason of the relative diameters of the sprockets shown for the purpose of illustration, be rotated at a rate which is twice the rate of rotation of the shaft 40. Hence, when the conveyors are driven through the double sprocket 48, the conveyor 11 will move at twice the linear velocity of the conveyor 12.

For effecting a selective driving connection between the shaft 29 and the double sprockets 41 or 48, a slidable clutch member 55 is splined on the shaft between the said sprockets and has teeth 55$^a$ and 55$^b$ on opposite faces thereof. The teeth 55$^a$ are adapted drivingly to engage teeth 41$^a$ formed on the adjacent end of the sprocket 41, while teeth 55$^b$ are adapted drivingly to engage teeth 48$^a$ of sprocket 49. By shifting the clutch member into driving engagement with the teeth of the sprocket 41 when the shaft 29 is operating in a clockwise direction as viewed in Fig. 4, the conveyors 11 and 12 will be driven as above described, the ratio of their linear velocities being 1 to 2. By shifting the clutch member into driving engagement with the teeth of the sprocket member 48 when the shaft 29 is operating in a counter-clockwise direction, the conveyors 11 and 12 will be operated at velocity ratios of 2 to 1. Other velocity ratios may be obtained by the use of sprockets of appropriate sizes.

As shown in Fig. 3 and more specifically in Figs. 6 and 7, the sprockets 44 and 53 are of the so-called free-wheeling type, that is, they are so constructed that each will drive its shaft only in one direction. Thus, as viewed in Fig. 4, sprocket 44 will drive the shaft 40 only in the clockwise direction, while sprocket 53 will drive the shaft 39 only in the counter-clockwise direction and will rotate freely or "free wheel" when they are driven in directions opposite from those mentioned. The sprockets 44 and 53 are provided with hub portions 44a and 53a, respectively, which are secured to the shafts 40 and 39a by pins 44b, 53b. The hubs are provided with roller recesses having inclined faces 44c, 53c in which recesses are rollers 44d, 53d, respectively, which are normally urged by springs 44e, 53e in directions tending to lock the sprockets directly to their respective hubs. Due to the arrangement of the faces 44c and 53c, however, when the sprocket 44 is rotated counter-clockwise and the sprocket 53 is rotated clockwise, the rollers are ineffective to effect the driving engagement mentioned as will be understood.

Hence, if when the shaft 29 and the clutch 55 are being operated in a clockwise direction, as viewed in Fig. 4, the clutch is moved into driving engagement with the teeth of the double sprocket 41, the latter will rotate the sprocket 44 clockwise and therefore the shaft 40 also, and will also rotate the sprocket 46 and the shaft 39 in the same direction but at a lower velocity. The shaft 39 will thereby operate the conveyor 11 to deliver dough to the sheeting rolls while the conveyor 12 will be the receiving conveyor. If the direction of rotation of the shaft 29 and clutch 55 is changed to counter-clockwise and the clutch is shifted into engagement with the teeth of its double sprocket 48, the sprocket 53 will be driven to operate shaft 40 in the counter-clockwise direction. Shaft 39, however, will have a greater velocity than shaft 40 which in this instance will operate the conveyor 12 in a direction to deliver dough to the sheeting rolls while the conveyor 11 will be the receiving conveyor and will be moving at a greater linear velocity than the conveyor 12. It will be seen, therefore, that when the sprocket 44 is driving the shaft 40 in a clockwise direction the sprocket 53 will be rotating at a greater velocity than shaft 39 and the rollers 53d will be inoperative to lock the sprocket to the shaft and the sprocket 53 will be free whereas, when the direction of movement of the various shafts is counter-clockwise, the rollers 44d of the sprocket 44 will be inoperative and the sprocket will "free wheel" with respect to the shaft 40. The two sprockets 44 and 53 are identical, but are placed on the respective shafts 40 and 39 in reversed positions and, as will be apparent, are shown in detail for illustrative purposes only, since it will be obvious that other types of free-wheeling or clutch sprockets may be employed if desired for the purposes mentioned.

For the purpose of shifting the clutch member 55 as described, a yoke member 56 is provided which is pivoted at 57 to a bracket 58 and is provided with an operating arm 59 through which extends a rod 60 which at one end is pivoted at 61 to one arm 62 of an inverted U-shaped handle indicated generally by numeral 63, the arms 62 and 62a of which handle are pivotally mounted at 64 to any suitable portion of the machine frame or casing. When the handle 63 is swung to the left or counter-clockwise as viewed in Fig. 4, as to the dotted line position, the arm 59 of the yoke-shaped shifter member will be swung in the same direction and the clutch member 55 will be moved into driving engagement with the teeth 41a of the sprocket 41. Swinging the handle 63 to the right or clockwise beyond the full line position illustrated in Fig. 4 will cause the clutch member to be shifted into engagement with the sprocket 48.

The rod 60 passes loosely through an opening in the arm 59 and is provided with two compression springs 65 and 66 on opposite sides of the arm, one or the other of which springs acts to cushion the movement of the clutch member into engagement with the teeth of the sprockets 41 or 48 depending on the direction of movement of the handle 63 to the right or left of the neutral or central position shown in full lines in Fig. 4.

Also attached to arms 62 and 62a of the handle 63 are links 67 which secure the same to a somewhat similar U-shaped handle 68 located on the opposite side of the frame as illustrated in Fig. 2. The handle 68 is pivotally mounted at 69 and due to the fact that links or bars 67 connect the handles they move in unison about their respective pivots. Hence the clutch 55 can be shifted by an operator while working at either conveyor.

For the purpose of preventing dough from passing downwardly between the inner ends of the conveyors 11 and 12 and the roll 18, stationary plates 70 and 71 are provided over which the dough slides in approaching or leaving the roll. The roll 18 extends above the plane of the conveyors, as illustrated in Fig. 2 which provides a greater area of the roll for contact with the dough and by reason of the friction thereby provided positively feeds the dough between the rolls.

For the purpose of preventing dough from clinging to the upper rolls two scrapers or doctors 72 and 73 are provided which are carried by a member indicated generally by the numeral 74 which is pivotally mounted on studs 75.

Recesses 76 are provided in the end plates 74a of the members 74 (only one being shown) through which the shaft 33 projects and which accommodate pivotal movement of the member 74 in moving one scraper or the other into contact with the roll. The frame like scraper carrying member 74 is rockable about the axis 75 by means of a link 78 pivoted thereto at 79 which link at its other end is pivoted to an arm of the handle 63 as shown in Fig. 2. When the handle 63 or 68 is swung counter-clockwise as viewed in Fig. 2, which movement shifts the clutch member 55 to cause the conveyors to move from left to right, the scraper blade 73 will be moved into engagement with the upper roll 19 while if the clutch is shifted in the opposite direction the blade 72 will be moved out of such engagement. Movement of a blade out of engagement with the roll 19 provides a passage on the side of the roll toward which the dough approaches through which flour from a sifter 82 can be sprinkled on the dough to prevent its sticking to the roll. Hence shifting the handles 63 and 68 not only operates the clutch 55 and thereby selects the velocity ratios of the conveyors and shifts the scrapers for cooperation with the roll 19 in accordance with the direction of travel of the dough, but it also controls the direction of operation of the conveyors and the rolls. For this latter purpose the motor 20 is of the reversible type and a reversing switch 83 is provided which has an operating lever or link 84 which is connected to a downward extension 85 on the adjacent arm of the handle 63. Thus when the handle 63 (or handle 68) is moved to the right or clockwise as viewed in Fig. 2, the clutch member 55 causes belt 11 to move at a speed greater than belt 12 and the switch 83 causes the motor to operate, in the instance mentioned, in a direction to cause the conveyors to move toward the left and the roll 18 to rotate counter-clockwise. Shifting the handles 63 or 68 to the neutral position shown stops the motor by reason of the operation of the switch 83 to the "off" position and hence arrests the operation of the machine, while shifting the handles counter-clockwise causes the motor to operate the conveyors to the right, the roll 18 clockwise and the roll 19 counter-clockwise. Such shifting of the handles as above described also swings the scraper frame 74 in such direction as to cause the proper scraper to contact the roll on the side from which the sheet of dough emerges and moves the other scraper away from the roll whereby flour from the shifter 82 can be sprinkled on the dough as it approaches the rolls.

For the purposes of moving the roll 19 for varying the spacing thereof with respect to the roll 18, a pair of rock levers 86 is provided, one lever on each side of the machine (one only being shown in Fig. 2) which are pivotally mounted on the shaft 31 of gear 30. The pivotal axis 80 and shaft 31 in Fig. 2 coincide but this fact is a mere coincidence and is true only when the handles 63 and 68 are in neutral position. The shaft 33 of the roll 19 is journaled in the inner ends of the levers 86 while the outer or right hand ends of the levers are connected by a rod or bar 88 through a threaded opening in which extends a threaded member 89 rotatably carried by a bracket 90 which is supported by a transverse shaft 91 having a hand wheel 92 on each end thereof to facilitate operation of the shaft from either side of the machine. The shaft 91 has a worm 93 which meshes with a worm wheel 94 carried by the threaded member 89. Rotation of the shaft 91 by means of either hand wheel 92 causes the rock levers to move pivotally on the axis 80 and thus raise or lower the shaft 33 of the roll 19. In such manner the roll 19 can be raised or lowered with respect to the roll 18 for predetermining the thickness of the sheet of dough. The studs 75 on which the scraper carrying member 74 is pivotally mounted are carried by links 95 secured to the inner ends of the rock lever 86 which latter thus support the member 74.

Secured to the links 95 are gauges 96 which, when the rolls 18 and 19 are in contact, have their upper end flush with the top of the machine casing. As the roll 19 is elevated the gauges will project above the casing each a distance corresponding to the space between the rolls and hence each will indicate the thickness of the dough being sheeted or about to be sheeted. Providing two such gauges, one on each side of the machine is a matter of convenience to the operator of the machine.

The outer ends of the conveyors are provided with flour trays 97 for catching flour and crumbs of dough that may drop from the ends of the conveyors.

Each of the handles 63, 68 is provided with a transverse bar or like member 98, which may constitute the means by which the tie links 67 are attached to the respective handles and which extend over the respective conveyors at such elevation that should an operator inadvertently hold his hand on the feeding conveyor and thus tend to be moved inwardly between the rolls, his hand or arm will engage the respective member 98 and shift the handle inwardly and thus stop the machine by reason of the resulting operation of the reversing switch to the neutral or "off" position as above explained. This result is attained regardless of the member 98 that is so engaged and moved since when either conveyor is acting as a feeding conveyor, the movement of the respective handle inwardly of the machine stops the motor. If the handle is moved inwardly beyond the neutral position under such circumstances, the operation of the machine would be reversed.

While we have shown and described an embodiment of our invention for the purpose of illustration, it will be apparent that various changes may be made therein without departing from the spirit of the invention.

This application is a continuation in part of our prior application for Dough sheeter, filed February 28, 1941, Serial No. 381,076.

We claim:

1. A dough sheeter comprising a pair of aligned endless conveyors spaced apart at the adjacent ends, a pair of cooperating sheeting rolls between said ends and arranged to receive dough therebetween from one of said conveyors for sheeting the same and delivering it to the other conveyor, means for operating said conveyors whereby one is operated at a linear velocity greater than the linear velocity of the other, means for operating said rolls, and means for reversing the direction of operation of the roll and conveyor operating means for effecting a reversal of the direction of operation of said rolls and conveyors and simultaneously reversing the ratio of the linear velocity of said conveyors.

2. A dough sheeting machine comprising a pair of cooperating sheeting rolls, means for operating the rolls, a pair of endless conveyors disposed on opposite sides of said rolls, means for operating said conveyors in a common direction whereby one of said conveyors receives and moves the sheeted dough in a direction away from the rolls, means for reversing the direction of rotation of the rolls and for reversing the direction of movement of the conveyors for returning the sheeted dough to the rolls in the opposite direction and means for increasing the relative linear velocity of each of said conveyors during the period during which the respective conveyor is receiving dough from the rolls.

3. A dough sheeting machine comprising a pair of cooperating sheeting rolls through which dough is passed to reduce it to sheet form, an operable conveyor for feeding dough to the rolls, a second operable conveyor for receiving sheeted dough from the rolls, means for reversing the direction of rotation of the rolls and for reversing the direction of movement of the dough conveyors whereby said feeding conveyor becomes a receiving conveyor and said receiving conveyor becomes a feeding conveyor and whereby the dough can be passed back and forth through the rolls, and means for controlling the relative velocity of said conveyors whereby the conveyor which at any given time acts as a receiver for dough from the rolls moves at a linear velocity greater than the velocity of the other conveyor.

4. A dough sheeter comprising a pair of cooperating rolls one disposed above the other and between which dough is adapted to be passed for reduction to sheet form, a shiftable member adjacent one of said rolls provided with a pair of scrapers located on opposite sides of the roll, said member normally retaining one or the other of said scrapers in contact with said roll for removing dough therefrom, reversible operating means for the rolls, and manually operable means for effecting the reversal of said operating means and arranged to simultaneously shift said shiftable member for moving the other scraper into contact with said roll and moving said first mentioned scraper away from said roll.

5. A dough sheeter comprising a pair of driven rolls one above the other and between which dough is adapted to be passed for reduction to sheet form, endless conveyors on opposite sides of the rolls operable in a common direction whereby one is adapted to feed dough to said rolls and the other is adapted to receive sheeted dough from the rolls and move it in a direction away from the rolls, means for operating said conveyors at different relative linear velocities, means for reversing the direction of rotation of the rolls and the direction of travel of the conveyors whereby a sheet of dough can be passed to and fro between the rolls, control mechanism for said reversing means and means operable by said control mechanism for reversing the relative linear velocities of said conveyors simultaneously with the reversal of the direction of movement thereof.

6. A dough sheeter comprising dough sheeting means, a pair of endless conveyors on opposite sides of said means and operable in a common direction whereby one is adapted to feed dough to said sheeting means and the other is adapted to receive sheeted dough and move it in a direction away from said means, operating means for said conveyors comprising two pairs of driving members, the driving members of one pair being arranged to operate one of said conveyors at a linear velocity greater than the linear velocity of a second conveyor, the driving members of said other pair being arranged to operate said second conveyor at a linear velocity greater than the linear velocity of said other conveyor and manually controlled clutch means for effecting the selective operation of either of said conveyor driving members.

7. A dough sheeting machine comprising a pair of endless conveyors disposed in aligned spaced apart relation, a pair of cooperating sheeting rolls between the adjacent ends of said conveyors, means for operating said conveyors in a common direction and for rotating said rolls for moving dough on one conveyor to and through the rolls and onto the second conveyor, means for operating said second conveyor at a greater linear velocity than the velocity of said first conveyor, and means for simultaneously reversing the direction of movement of said conveyors and the velocity ratio thereof and for reversing the direction of rotation of said rolls for causing the dough sheet to be passed through said rolls in the opposite direction.

8. A sheeting machine comprising a pair of driven sheeting rolls, endless conveyors on opposite sides of the rolls operable in a common direction whereby one is adapted to feed material to the rolls and the other is adapted to receive the sheeted material, a reversible motor, means driven by the motor when operating in one direction for so operating the rolls and conveyors that the material is fed to the rolls in a given direction and the receiving conveyor is operated at a linear velocity greater than the feeding conveyor, and manually operable means for effecting a reversal of direction of operation of the motor and of the rolls and conveyors and a simultaneous reversal of the velocity ratios of the conveyors.

FRANK A. ANETSBERGER.
DEAN H. WHITEHEAD.